United States Patent [19]

Shapton

[11] Patent Number: 5,106,252
[45] Date of Patent: Apr. 21, 1992

[54] INTERLOCKING WASHER ASSEMBLY

[76] Inventor: W. Robert Shapton, E. 2503 - 42nd Ave., Spokane, Wash. 99223

[21] Appl. No.: 629,403

[22] Filed: Dec. 18, 1990

[51] Int. Cl.[5] .......................................... F16B 43/02
[52] U.S. Cl. .................................. 411/539; 411/519
[58] Field of Search ............... 411/539, 540, 532, 541, 411/531, 516, 517, 518, 519, 521, 522, 149

[56] References Cited

U.S. PATENT DOCUMENTS

| | | | |
|---|---|---|---|
| 239,111 | 3/1881 | O'Meara | 411/539 |
| 554,431 | 2/1896 | White | 411/539 |
| 647,928 | 4/1900 | Adams | 411/539 |
| 1,075,760 | 10/1913 | Butler | 411/540 |
| 1,151,131 | 8/1915 | Starliper | 411/539 |
| 1,221,023 | 4/1917 | Cameron | 411/532 |
| 1,327,417 | 1/1920 | Barton | 411/540 |
| 1,332,626 | 3/1920 | Henegar | 411/539 |
| 1,452,492 | 4/1923 | Carpenter | 411/539 |
| 1,492,561 | 5/1924 | Gabriel | 411/539 |
| 1,597,525 | 8/1926 | Knake | 411/540 |
| 1,662,441 | 3/1928 | Sexton | 411/539 |
| 1,784,667 | 12/1930 | Gillet | 411/532 |
| 2,358,606 | 9/1944 | Summers | 411/539 |
| 3,495,496 | 2/1970 | Keim | 411/539 |
| 4,274,323 | 6/1981 | Resnicow | 411/539 |

FOREIGN PATENT DOCUMENTS 723028 7/1942 Fed. Rep. of Germany .
1206230 2/1960 France .
1206231 2/1960 France .

*Primary Examiner*—Rodney M. Lindsey
*Attorney, Agent, or Firm*—Wells, St. John & Roberts

[57] ABSTRACT

A washer assembly which may be assembled and locked into place without fully removing a bolt or screw is described herein. The assembly is comprised of at least two identical segments, each having a male end and a female end. The segments are fitted together, preferably along a planar axis the male end of one segment fitting into the female end of the second segment; and the male end of a second segment fitting into the female end of the first segment. The male end is comprised of a flattened tongue, preferably circular, having convex nodules on at least one surface of the tongue. The female end is comprised of two flattened essentially parallel leaves forming the opening of a slot. At least one inner surface of this slot has at least one complementary concave depression. When the flattened tongue fits into the slot the convex nodules snap into the complementary concave depressions, locking the segments of the washer assembly together. Alternatively, the tongue will have at least one concave depression on at least one surface; and at least one inner surface of the leaves of the female end will have at least one convex nodule, said nodules being received by the depressions on the tongue surface or surfaces when the male end is fitted into the female end.

18 Claims, 3 Drawing Sheets

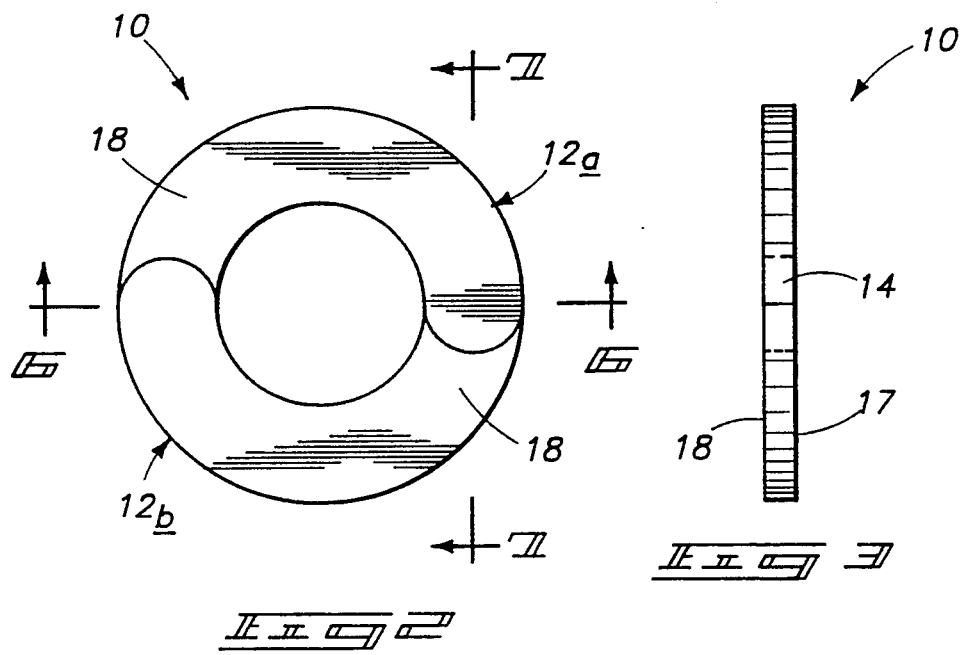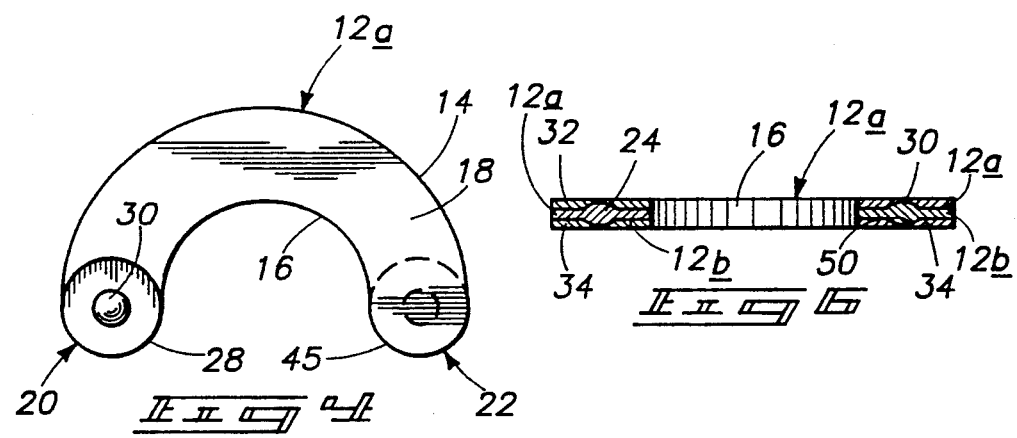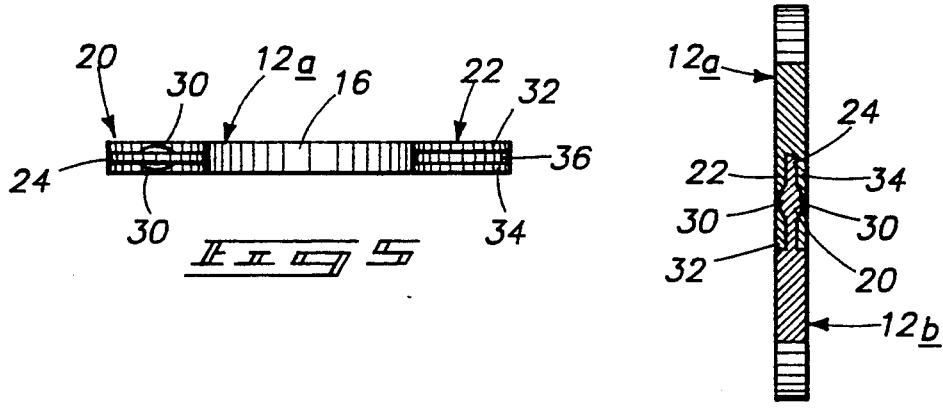

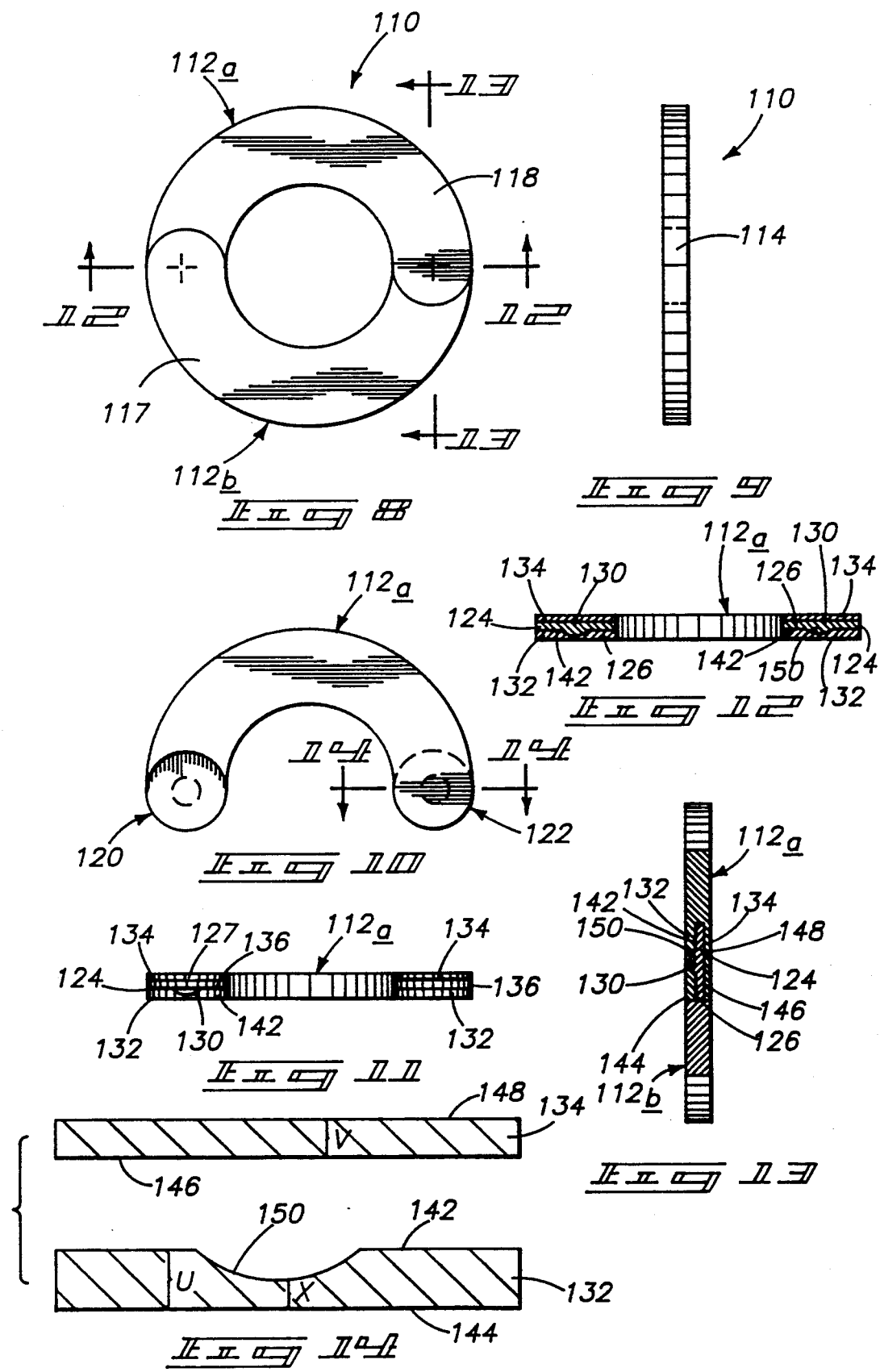

INTERLOCKING WASHER ASSEMBLY

TECHNICAL FIELD

This invention relates to two-piece washers which may be assembled or mounted to a shaft or bolt after the shaft or bolt is in place, that are classified by the United States Patent and Trademark Office in class 411 subclass 539.

BACKGROUND OF THE INVENTION

A number of two piece washer assemblies are known in the art. These assemblies are comprised of two or more segments which may be mounted in place about a shaft without fully removing a screw, or nut and bolt. This is useful for adding a washer without completely unthreading a screw or bolt. These assemblies also make it easier to insert a screw or bolt initially without the need to hold a washer in place. The washer assembly can simply be mounted after the bolt or screw is in place.

U.S. Pat. No. 647,928 to Adams shows a washer assembly having two identical semicircular segments. The ends of each segment are bifurcated into two radially spaced leaves of narrow thickness, wherein one leaf is raised, and one is depressed. The raised leaf of one segment is fitted over the depressed leaf of the second segment, such that the segments have an overlapping portion.

U.S. Pat. No. 554,431 to White also shows a washer assembly with two identical semicircular segments. One end of each segment has a recess, and the other end has a projecting tenon. The tenon of one segment fits into the recess of the second segment, while the tenon of the second segment fits into the recess of the first segment.

A need remains to improve upon these prior art devices.

BRIEF DESCRIPTION OF THE DRAWINGS

The preferred embodiments of the invention are illustrated in the accompanying drawings, in which:

FIG. 2 shows a top view of the assembled washer of FIG. 1;

FIG. 3 shows a side view of the assembled washer of FIG. 1;

FIG. 4 shows a top view of one segment of the washer assembly of FIG. 1;

FIG. 5 shows a front side view of the segment of FIG. 4;

FIG. 6 shows a sectional view taken along line 6—6 of FIG. 2;

FIG. 7 shows a sectional view taken along line 7—7 of FIG. 2;

FIG. 8 shows a top view of a second preferred embodiment of a washer assembly;

FIG. 9 shows a side view of the washer assembly of FIG. 8;

FIG. 10 shows a top view of one segment of the washer assembly of FIG. 8;

FIG. 11 shows a front side view of the segment of FIG. 10;

FIG. 12 shows a sectional view taken along line 12—12 of FIG. 8;

FIG. 13 shows a sectional view taken along line 13—13 of FIG. 8; and

FIG. 14 shows a sectional view taken along line 14—14 of FIG. 10.

DETAILED DESCRIPTION OF THE PREFERRED EMBODIMENTS

Figure 1:
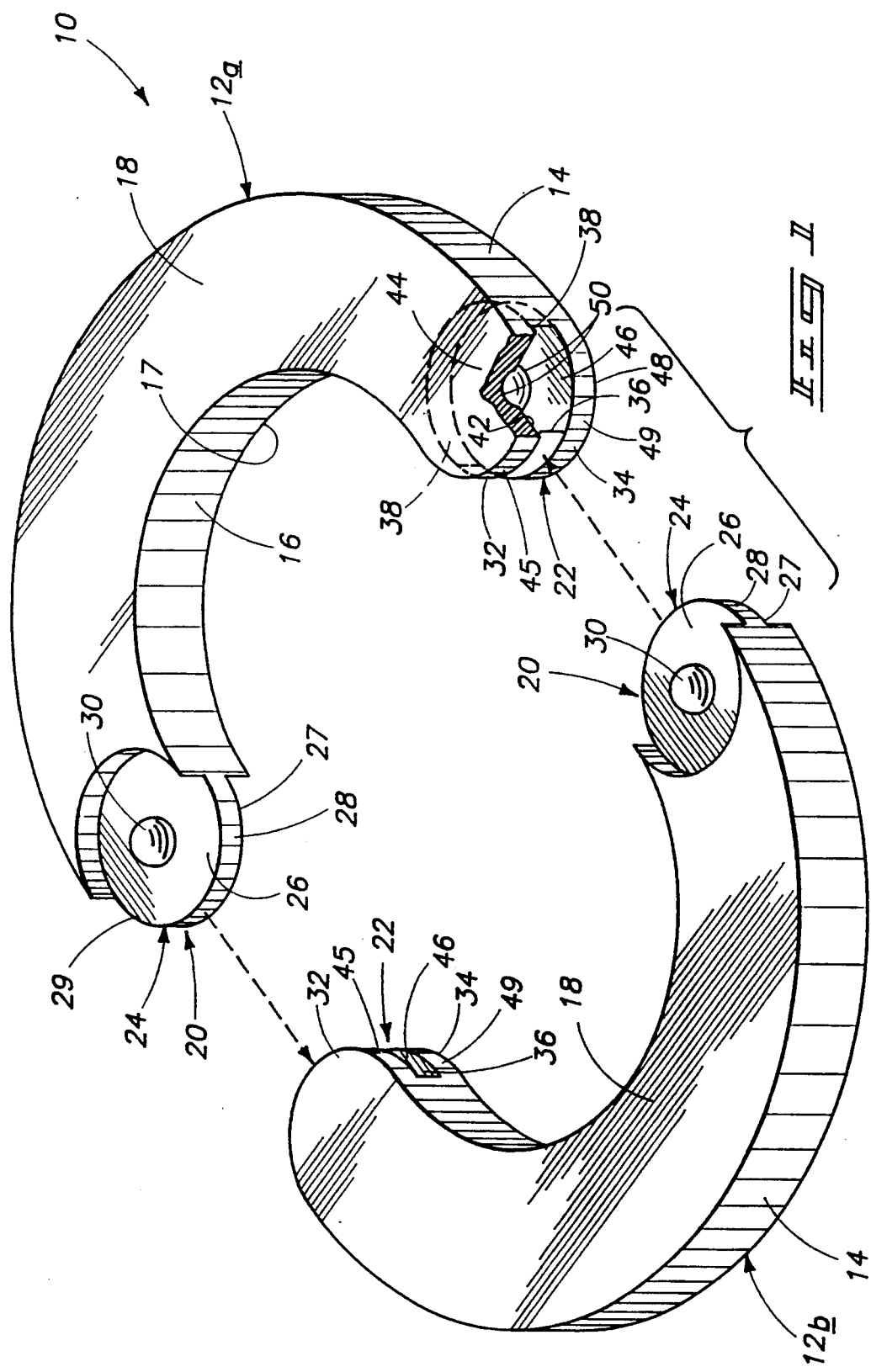
FIG. 1 shows an exploded or disassembled view of a first preferred embodiment of a washer assembly in accordance with the invention.

The following disclosure of the invention is submitted in furtherance with the constitutional purpose of the Patent Laws "to promote the progress of science and useful arts" (Article 1, Section 8).

Referring to FIGS. 1-7, a preferred embodiment of a washer assembly of this invention is indicated generally by reference numeral 10. Washer assembly 10 can be assembled around a screw or bolt without having to completely unthread the screw or bolt.

Washer assembly 10 is comprised of two segments 12a and 12b. These segments are identical, and fit together end into end, as may be seen in FIG. 1. Segments 12a and 12b each have an outer sidewall 14, an inner sidewall 16, a first planar surface 17, and a second planar surface 18. The planar surfaces 17 and 18 are approximately parallel, but may be non-parallel. The two identical segments are preferably semi-circular in shape, but may have other shapes, such as having a rectangular shaped outer sidewall.

Each segment 12a and 12b has a male end 20 and a female end 22. The male end 20 is comprised of a flattened, narrow, disk shaped tongue 24. Flattened tongue 24 has a first planar surface 26 and a second planar surface 27. Surfaces 26 and 27 are oppositely facing and approximately parallel. A sidewall 28 of tongue 24 extends from inner sidewall 16 continuously to outer sidewall 14, preferably forming an arc shape between sidewalls 16 and 14. Sidewall 28 has a width (thickness) dimension between planar surface 26 and planar surface 27, which is also the width (thickness) of tongue 24. The width or thickness of tongue 24 is preferably less than the width or thickness of washer segment sidewalls 14 and 16.

Male end 20 has at least one convex nodule 30 on at least one surface 26 or 27 of tongue 24. Nodule 30 is illustrated as being placed approximately in the center of planar surface 26 or planar surface 27 of tongue 24, as is shown in FIG. 1. Although not viewable in FIG. 1, a nodule is provided upon each of opposing tongue surfaces 26 and 27, as is shown in FIG. 6. Nodules 30 will project from the tongue surfaces 26 and/or 27 to increase the tongue thickness at that location.

Female end 22 is comprised of two approximately parallel leaves comprising a first leaf 32 and a second leaf 34. Leaves 32 and 34 are preferably semicircular in shape as viewed from their exteriors, but may be of other shapes. First leaf 32 has an inner surface 42, an outer surface 44, and a sidewall surface 45. Second leaf 34 has an inner surface 46, an outer surface 48 and a sidewall surface 49. The leaves are preferably of approximately uniform thickness, but may be tapered or of varying thicknesses. Inner surfaces 42 and 46 oppose each other and extend into the interior of the washer segment to define a circular receptacle or slot 36 having a defined open width for receiving a tongue 24 of another segment. Slot 36 has an inner sidewall 38. Outer surfaces 44 and 48 of leaves 32 and 34 integrally merge with planar surfaces 17 and 18 of washer segments 12a or 12b.

Female end 22 includes at least one concave depression 50 on at least one interior surface of slot 36. As illustrated, a concave depression 50 is provided on each of inner leaf surfaces 42 and 46. Concave depressions 50 are preferably located in the approximate center of inner surfaces 42 and 46 to correspond with the position of nodules 30 on tongues 24. When tongue 24 is fully fitted into slot 36, nodules 30 on tongue surfaces 26 and 27 are received by concave depressions 50. Tongues 24 and nodules 30 preferably provide an overall tongue thickness at the nodule which is greater than the slot open width. As tongue 24 is slid into complementary slot 36, nodules 50 will resiliently force or spread leaves 32 and 34 outward. As nodules 30 reach depressions 50, tongue 24 snaps into a locked position within slot 36 with leaves 32 and 34 substantially returning to their original orientation relative to one another.

To facilitate and enable resilient spreading of leaves 32 and 34, the material of construction of components 12a and 12b is preferably a somewhat flexible, resilient plastic. Resilient plastic materials also allow washer assembly 10 to be compressed somewhat under a screw or bolt without loosening or disturbing the internal locking mechanism shown in these embodiments. The washer assembly may be economically manufactured through molding processes well known in the art.

Alternatively, the tongue 24 could be provided with at least one depression on at least one surface 26 and/or 27, with leaves 32 and 34 having at least one complementary nodule on at least one inner surface 42 and/or 44.

To assemble washer segments into washer assembly 10, two segments 12a and 12b are advantageously fitted together along a plane perpendicular to the axis of washer assembly 10. This permits easy assembly of washer 10 within a very constricted space, unlike much of the prior art. Male end 20 of a first washer segment 12a is fitted into female end 22 of a second washer segment 12b. Male end 20 of a second washer segment 12b is fitted into female end 22 of first washer segment 12a. Tongue 24 of each male end is completely received by slot 36 of each female end such that sidewall 28 of tongue 24 abuts inner sidewall 38 of slot 36. Nodules 30 are aligned with and received by concave depressions 50. As tongue 24 is received by slot 36, nodules 30 spread leaves 32 and 34 apart and then snap into depressions 50, locking washer assembly segments together. When assembled, all surfaces of tongue 24 are in contact with the inner surfaces of slot 36. The placement of tongue 24 within slot 36 in this manner confers lateral strength as well as axial strength to the assembly structure. Additionally, each pair of male and female ends may be snapped together separtely, facilitating the assembly process.

FIGS. 6 and 7 best illustrate the complementary fit of nodules 30 with depressions 50.

FIGS. 8 through 13 show an alternative embodiment of the washer assembly, indicated by the numeral 110. Embodiment 110 is similar to embodiment 10, with like components in embodiment 110 using the same numerals of embodiment 10, but preceded by a "1." Washer assembly 110 differs from the previous embodiment in that at least one nodule 130 is present on only one of tongue surfaces 126 or 127. Additionally, at least one concave depression 150 is present on only one inner surface 142 or 146 of leaves 132 and 134 respectively. Alternative embodiment 110 further differs from embodiment 10 in that the leaves of the female end are asymmetric and of unequal widths (thickness), as is most clearly seen in FIG. 14. This gives additional structural strength to the tongue and leaf interface portion of the washer assembly, as is described more fully below. Tongue 124 of embodiment 110 is asymmetrically placed along washer segment 112a, as seen in FIG. 11.

More specifically, FIG. 8 shows the two alternative washer segments 112a and 112b assembled. Washer segments 112a and 112b are identical in this embodiment. In this embodiment, however, first planar surface 118 of one segment is aligned with second planar surface 117 of the second segment, so that one segment is inverted before insertion into a second segment.

FIG. 11 shows nodule 130 present on one surface 126 only of tongue 124 of male end of segment 112a. Surface 127 of tongue 124 has no nodule. Tongue 124 protrudes asymmetrically from washer segment 112a.

FIG. 12 shows a cross-sectional view of the assembled washer of FIG. 8, showing the complementary fit of tongue 124 with asymmetric leaves 132 and 134. Nodule 130 is present on surface 126 of tongue 124 only. Concave depression 150 is present on the inner surface 142 of leaf 132 only. FIG. 12 shows segments 112a and 112b inverted one from the other when male ends 120 are inserted into female ends 122.

FIGS. 11, 12, and 13 show nodules 130 and depressions 150 preferably placed approximately in the center of tongue surfaces 126 and leaf surfaces 142, strengthening the interlocking tongue/leaf interfaces when washer 110 is assembled.

FIG. 14 shows leaf 132 having a thickness dimension "u" and leaf 134 having a thickness dimension "v." Dimension "u" is larger than dimension "v." FIG. 14 also shows a dimension "x," which is the distance from base of concave depression 150 to outer surface 144 of leaf 132. Dimension "x" is approximately the same as thickness "v" of leaf 134. This structure of female end 122 allows equal thickness "x" and "v" of leaves 132 and 134 respectively to surround tongues 124 when male ends 120 are inserted into female ends 122. This strengthens the male/female interface of this embodiment 110 of the washer assembly.

The washer assemblies 10 and 110 described herein may be assembled around a screw or bolt without unthreading the screw or bolt. Its features allow the washer assembly segments to snap together along a relatively narrow area under the screw or bolt. Its internal locking mechanism allows it to be compressed without dislodging or deforming the assembled washer. Compression of this assembly enhances the strength of the locking mechanism disclosed herein. The male and female interlocking parts of the described embodiments fit together intimately, with every surface of the male end in contact with complementary surfaces on the female end. This intimate contact confers lateral as well as axial strength to the interlocking portions of the assembled washer.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

What is claimed is:

1. A washer assembly, comprising at least two identical segments, wherein each segment has
  a) a female end, and
  b) a male end;
the female end of one segment receiving the male end of another identical complementary segment;
each female end having two opposed approximately parallel leaves forming a slot for receiving a male end, the slot having a defined open width;
each leaf having an inner outer surface;
at least one inner leaf surface having at least one concave depression;
the male end comprising a flattened tongue for fitting into the slot of a female end;
said tongue having oppositely facing approximately parallel surfaces;
said tongue having at least one convex nodule on at least one oppositely facing surface thereof, the nodule being complementary to the depression, the nodule and tongue having an overall thickness which is greater than the slot open width;
wherein the nodule of each tongue locks into the complementary depressions of the female segments when the tongue of a male end of one segment is inserted into the slot of a female end of another segment; and
wherein the opposed leaves of the female end are of unequal thicknesses, the leaf with at least one concave depression on its inner surface having a greater thickness that the opposed leaf without a concave depression on its inner surface.

2. The washer assembly of claim 1 wherein each segment is semicircular in shape.

3. The washer assembly of claim 1 wherein the thickness of the leaf without a concave depression on its inner surface is approximately equal to a smallest thickness of the leaf with a depression measured between its outer surface and the depression.

4. The washer assembly of claim 1 wherein the segments fit together along a plane perpendicular to the axis of the assembly.

5. The washer assembly of claim 1 wherein the tongue of the male end is of a substantially circular disc shape.

6. A washer assembly, comprising:
at least two identical segments, wherein each segment has
  a) a female end, and
  b) a male end;
the female end of one segment receiving the male end of another identical complementary segment;
each female end having two opposed approximately parallel leaves forming a slot for receiving a male end, the slot having a defined open width;
each leaf having an inner and outer surface;
each leaf inner surface having at least one concave depression;
the male end comprising a flattened tongue for fitting into the slot of a female end;
said tongue having oppositely facing approximately parallel surfaces;
said tongue having at least one convex nodule on each oppositely facing surface thereof, the nodules being complementary to the depressions, the nodules and tongue having an overall thickness that is greater than the slot open width;
wherein the nodule of each tongue locks into the complementary depressions of the female segments when the tongue of a male end of one segment is inserted into the slot of a female end of another segment; and
wherein the opposed leaves of the female end are of unequal thicknesses, the leaf with at least one concave depression on its inne surface having a greater thickness than the opposed leaf without a concave depression on its inner surface.

7. The washer assembly of claim 6 wherein each segment is semicircular in shape.

8. The washer assembly of claim 6 wherein the thickness of the leaf without a concave depression on its inner surface is approximately equal to a smallest thickness of the leaf with a depression measured between its outer surface and the depression.

9. The washer assembly of claim 6 wherein the segments fit together along a plane perpendicular to the axis of the assembly.

10. The washer assembly of claim 6 wherein the tongue of the male end is of a substantially circular disc shape.

11. A washer assembly, comprising:
at least two identical segments, wherein each segment has
  a) a female end, and
  b) a male end;
the female end of one segment receiving the male end of another identical complementary segment;
each female end having two opposed approximately parallel leaves forming a slot for receiving a male end, the slot having a defined open width;
each leaf having an inner and outer surface;
only one leaf inner surface having at least one concave depression;
the male end comprising a flattened tongue for fitting into the slot of a female end;
said tongue having oppositely facing approximately parallel surfaces;
said tongue having at least one convex nodule on only one of the oppositely facing surfaces thereof, the nodule being complementary to the depression, the nodule and tongue having an overall thickness which is greater than the slot open width;
wherein each nodule locks into a complementary depression on one inner surface of a leaf when the tonque of a male end of one segment is inserted into the slot of a female end of another segment; and
wherein the opposed leaves of the female end are of unequal thicknesses, the leaf with at least one concave depression on its inner surface having a greater thickness than the opposed leaf without a concave depression on its inner surface.

12. The washer assembly of claim 11 wherein each segment is semicircular in shape.

13. The washer assembly of claim 11 wherein the segments of the assembly are made of flexible plastic material.

14. The washer assembly of claim 11 wherein the segments fit together along a plane perpendicular to the axis of the assembly.

15. The washer assembly of claim 11 wherein the tongue of the male end is of a substantially circular disc shape.

16. The washer assembly of claim 11 wherein the thickness of the leaf without a concave depression on its inner surface is approximately equal to a smallest thickness of the leaf with a depression measured between its outer surface and the depression.

17. A washer assembly, comprising
at least two segments, wherein each segment has
 a) a female end, and
 b) a male end;
the ends being spaced to opposite sides of a central axis;
the female end of one segment receiving the male end of another complementary segment;
each female end having two opposed approximately parallel leaves forming a slot for receiving a male end;
each leaf having an inner and other surface;
each male end comprising a flattened tongue for fitting into the slot of a female end;
said tongue having oppositely facing approximately parallel surfaces;
wherein one end of each segment includes at least one convex nodule on at least one surface thereof;
wherein a remaining end of each segment includes at least one concave depression on at least one surface thereof, the depression being complementary to the convex nodule on the at least one surface of the one end;
wherein said nodule of one segment will lock into the complementary concave depression of the other segment when the tongue of a male end of the segment is inserted into the slot of a female end of the other segment; and
wherein the opposed leaves of the female end are of unequal thicknesses, the leaf with at least one concave depression on its inner surface having a greater thickness than the opposed leaf without a concave depression on its inner surface.

18. The washer assembly of claim 17 wherein the thickness of the leaf without a concave depression on its inner surface is approximately equal to a smallest thickness of the leaf with a depression measured between its outer surface and the depression.

* * * * *